No. 883,102. PATENTED MAR. 24, 1908.
W. O. C. ELLIS.
NUT LOCK FOR AXLE SPINDLES.
APPLICATION FILED MAY 16, 1907.
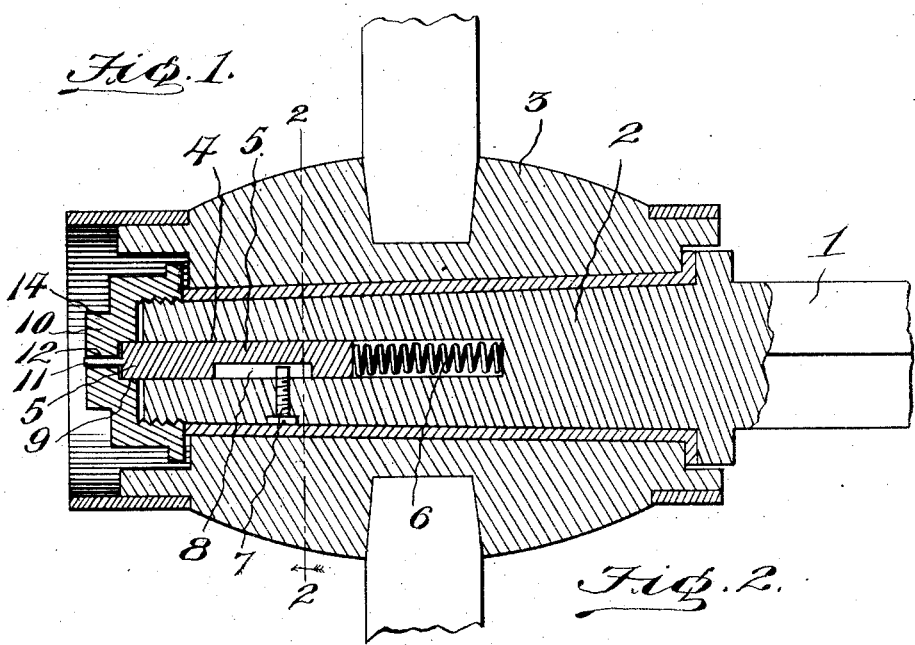
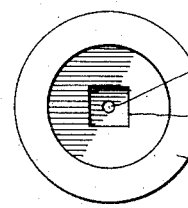
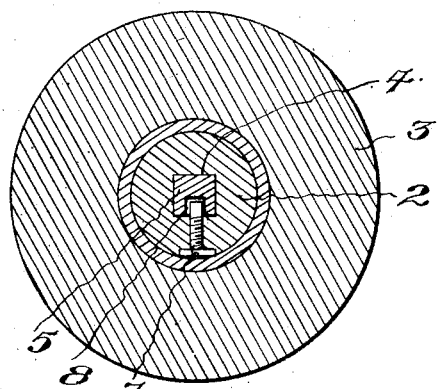
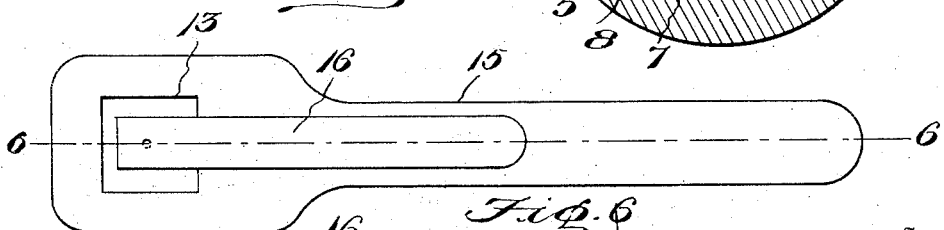
Inventor
Willis O. C. Ellis,
By Victor J. Evans
Attorney
Witnesses
J. T. L. Wright
C. Bradway

UNITED STATES PATENT OFFICE.

WILLIS O. C. ELLIS, OF GREENFIELD, OHIO.

NUT-LOCK FOR AXLE-SPINDLES.

No. 883,102.

Specification of Letters Patent.

Patented March 24, 1908.

Application filed May 16, 1907. Serial No. 373,913.

*To all whom it may concern:*

Be it known that I, WILLIS O. C. ELLIS, a citizen of the United States, residing at Greenfield, in the county of Fayette and State of Ohio, have invented new and useful Improvements in Nut-Locks for Axle-Spindles, of which the following is a specification.

This invention relates to a nut lock for axle spindles for positively maintaining the wheel on the spindle, and while the invention is particularly adapted to this use, it possesses certain features rendering it adaptable for use in connection with bolts.

The invention has for one of its objects to improve and simplify the construction and operation of devices of this character so as to be comparatively easy and inexpensive to manufacture, thoroughly reliable and efficient in use, and conveniently applied.

A further object of the invention is the provision of a nut lock including a locking member or follower mounted in the spindle of an axle or shank of a bolt as the case may be, and adapted to engage in a socket in the nut and released from the socket by a special form of wrench when it is desired to move the nut.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a longitudinal section of an axle spindle and hub portion of a wheel with the improved nut lock applied thereto. Fig. 2 is a transverse section on line 2—2, Fig. 1. Fig. 3 is a view of the axle nut removed. Fig. 4 is an end view of the axle spindle. Fig. 5 is a plan view of the lock-releasing wrench. Fig. 6 is a longitudinal section thereof.

Similar reference characters are employed to designate corresponding parts throughout the several views.

Referring to the drawing, 1 designates an axle having a spindle 2 on which rotates a wheel 3 of usual form. The spindle 2 has a central bore 4 extending inwardly from the outer end to a suitable distance and in which is located a longitudinally movable locking member or bolt 5 which is normally urged outwardly by a helical compression spring 6 disposed between the inner ends of the locking member 5 and bore 4. The locking member is retained in the bore by a key in the form of a countersunk screw 7 arranged in the spindle and extending into a longitudinal slot 8 in the locking member. The outer end of the locking member is adapted to engage in a non-circular socket 9 in the inner face of the cap-nut 10 that screws on the threaded portion of the axle spindle, the locking pin being non-circular where it enters the socket so as to prevent the nut from working loose. In order to hold the member 5 in unlocking position, a pin-like extension 11 is formed on the outer member that projects through a central opening 12 in the nut.

A special form of wrench is required for taking off or screwing on the nut. Preferably, the wrench, as shown in Figs. 5 and 6, is of that type commonly used for buggies and has a non-circular opening 13 for engaging around the non-circular portion 14 of the nut. The shank 15 is cast or otherwise formed with a web 16 that projects across the opening 13 on which is a pin or key 17 which is so located as to engage the projection 11 of the locking pin and cause the latter to be forced inwardly as the wrench is placed on the nut. As long as the wrench is on the nut, the locking member will be held in unlocking position, thereby permitting the nut to be removed or placed on the spindle, and as soon as the wrench is removed and after screwing on the nut, the locking pin will spring outwardly and engage in the socket 9.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claims.

Having thus described the invention, what I claim is:

1. In a nut lock, the combination of a member provided with a bore extending inwardly from one end and with a threaded aperture disposed transversely to the bore and leading into the latter, a longitudinally-movable locking piece held from rotation in the bore, a spring disposed in the bore and bearing against the inner end of the said piece, a nut threaded on the member and having a central opening, an element held on the member by the nut, a stem on the piece normally filling the opening of the nut to exclude dirt, and a screw in the threaded aperture of the member and arranged with its inner end engaged in a longitudinal slot in the said piece for removably holding the latter in place, the screw being retained in position by the said element and having its outer end countersunk in the member.

2. In a nut lock, the combination of an axle having a longitudinal, central bore extending inwardly from one end, a locking element movable longitudinally in the bore and provided with a longitudinal slot in one side, a spring in the bore acting on the element, a wheel on the axle, a nut on the axle for holding the wheel in place and having a central opening, a pin-like extension on the element passing through the opening of the nut and normally filling the latter, a removable retaining device secured in the axle and engaging in the groove of the element for removably holding the latter in place, said retaining device being located at such a point as to be retained in position by the wheel.

In testimony whereof I affix my signature in presence of two witnesses.

WILLIS O. C. ELLIS.

Witnesses:
  C. S. ELLIS,
  W. E. KNEDLER.